United States Patent
Reagor et al.

(10) Patent No.: US 11,875,222 B1
(45) Date of Patent: Jan. 16, 2024

(54) MAINTAINING CALIBRATION IN A QUANTUM COMPUTING SYSTEM

(71) Applicant: Rigetti & Co, LLC, Berkeley, CA (US)

(72) Inventors: Matthew J. Reagor, Corte Madera, CA (US); Christopher Butler Osborn, Oakland, CA (US); Alexa Nitzan Staley, San Francisco, CA (US); Sabrina Sae Byul Hong, Oakland, CA (US); Benjamin Jacob Bloom, Oakland, CA (US); Alexander Papageorge, San Francisco, CA (US); Nasser Alidoust, Berkeley, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 657 days.

(21) Appl. No.: 16/134,177

(22) Filed: Sep. 18, 2018

Related U.S. Application Data (60) Provisional application No. 62/560,004, filed on Sep. 18, 2017.

(51) Int. Cl.
*G06N 10/00* (2022.01)
*G06N 7/00* (2023.01)
(Continued)

(52) U.S. Cl.
CPC .............. *G06N 10/00* (2019.01); *G06N 7/00* (2013.01); *G06N 10/40* (2022.01); *G06N 10/70* (2022.01); *G06N 20/00* (2019.01)

(58) Field of Classification Search
CPC ........... G06N 10/00; G06N 20/00; G06N 7/00
See application file for complete search history.

(56) References Cited

U.S. PATENT DOCUMENTS 2,653,243 A 9/1953 Mcclellan
3,406,353 A 10/1968 Mueller, Jr.
(Continued)

FOREIGN PATENT DOCUMENTS

WO 2009/143166 11/2009
WO 2018/165500 9/2018

OTHER PUBLICATIONS

Aspuru-Guzik et al., "Device-Tailored Model-Free Error Correction in Quantum Processors" Sep. 15, 2017, U.S. Appl. No. 62/559,081. (Year: 2017).*

(Continued)

*Primary Examiner* — Miranda M Huang
*Assistant Examiner* — Chase P. Hinckley
(74) *Attorney, Agent, or Firm* — Henry Patent Law Firm PLLC (57) ABSTRACT

In a general aspect, a method executed in a quantum computing system includes performing a calibration process in the quantum computing system to identify a value of a parameter of the quantum computing system. The method also includes analyzing a variation of the value in response to a change in a condition of the quantum computing system, thereby determining a stability of the parameter. The method additionally includes scheduling a recalibration of the parameter based on the stability of the parameter and executing a quantum algorithm in the quantum computing system based on the value of the parameter identified by the calibration process.

25 Claims, 5 Drawing Sheets

(51) Int. Cl.
  *G06N 20/00* (2019.01)
  *G06N 10/40* (2022.01)
  *G06N 10/70* (2022.01)

(56) References Cited

U.S. PATENT DOCUMENTS

| | | | |
|---|---|---|---|
| 7,135,701 | B2 | 11/2006 | Amin et al. |
| 8,089,286 | B2 | 1/2012 | Silva et al. |
| 9,438,246 | B1 | 9/2016 | Naaman |
| 9,755,133 | B1* | 9/2017 | Nayfeh ............... G06N 10/00 |
| 9,940,212 | B2* | 4/2018 | Kelly ............... G06F 11/2273 |
| 10,282,675 | B2 | 5/2019 | Bloom et al. |
| 10,552,755 | B2* | 2/2020 | Lanting ............... G06N 10/00 |
| 10,635,989 | B2* | 4/2020 | Blais ............... H01L 39/025 |
| 10,643,143 | B2 | 5/2020 | Bloom et al. |
| 10,956,830 | B1 | 3/2021 | Rigetti et al. |
| 11,127,893 | B2* | 9/2021 | Johnson ............... G06N 10/00 |
| 11,164,103 | B2 | 11/2021 | Bloom et al. |
| 11,244,240 | B2* | 2/2022 | Martinis ............... G06N 10/00 |
| 2004/0173792 | A1 | 9/2004 | Blais et al. |
| 2009/0259905 | A1* | 10/2009 | Silva ............... G06N 10/00 977/933 |
| 2011/0060780 | A1 | 3/2011 | Berkley et al. |
| 2011/0133770 | A1 | 6/2011 | Przybysz et al. |
| 2011/0175062 | A1 | 7/2011 | Farinelli et al. |
| 2012/0319085 | A1 | 12/2012 | Gambetta et al. |
| 2014/0229722 | A1* | 8/2014 | Harris ............... B82Y 10/00 713/1 |
| 2016/0267032 | A1 | 9/2016 | Rigetti et al. |
| 2016/0328659 | A1* | 11/2016 | Mohseni ............... G06N 7/005 |
| 2017/0083873 | A1* | 3/2017 | Syrichas ............ G06Q 10/1095 |
| 2017/0091649 | A1* | 3/2017 | Clarke ............... G06N 10/00 |
| 2017/0214410 | A1* | 7/2017 | Hincks ............... H03L 7/26 |
| 2017/0255871 | A1* | 9/2017 | Macready ............... G06N 7/005 |
| 2017/0330101 | A1* | 11/2017 | Hastings ............... G06N 99/007 |
| 2017/0351967 | A1* | 12/2017 | Babbush ............... G06N 20/00 |
| 2017/0364362 | A1* | 12/2017 | Lidar ............... G06N 10/00 |
| 2018/0090200 | A1* | 3/2018 | Soykal ............... G11C 11/42 |
| 2018/0101784 | A1* | 4/2018 | Rolfe ............... G06F 15/80 |
| 2018/0225586 | A1* | 8/2018 | Chow ............... H03K 19/1958 |
| 2018/0260732 | A1 | 9/2018 | Bloom et al. |
| 2018/0330264 | A1* | 11/2018 | Lanting ............... G06N 10/00 |
| 2018/0330265 | A1* | 11/2018 | Kelly ............... H01L 29/66977 |
| 2020/0210876 | A1* | 7/2020 | Rolfe ............... G06N 10/00 |
| 2020/0234171 | A1* | 7/2020 | Chu ............... B82Y 10/00 |
| 2020/0274554 | A1* | 8/2020 | Aspuru-Guzik ....... G06N 10/00 |
| 2021/0035005 | A1* | 2/2021 | Martinis ............... G06K 9/6256 |

OTHER PUBLICATIONS

Romero et al., "Quantum autoencoders for efficient compression of quantum data" Aug. 18, 2017, Quantum Science and Technology, pp. 1-12. (Year: 2017).*
Olson et al., "Quantum Information and Computation for Chemistry" 2016, pp. 1-57. (Year: 2016).*
Holton, William, "Quantum Computer" 2020, Encyclopaedia Brittannica, pp. 1-4. (Year: 2020).*
Ahsan et al., "Designing a Million-Qubit Quantum Computer Using a Resource Performance Simulator" Dec. 2015, pp. 1-25. (Year: 2015).*
Weber et al., "Coherent Coupled Qubits for Quantum Annealing" Jul. 10, 2017, pp. 1-13. (Year: 2017).*
Kelly et al., "Scalable in situ qubit calibration during repetitive error detection" Sep. 26, 2016, pp. 1-8. (Year: 2016).*
Haner et Steiger, "0.5 Petabyte Simulation of a 45-Qubit Quantum Circuit" Apr. 4, 2017. (Year: 2017).*
Miller et al., "Quantum supremacy in constant-time measurement-based computation: A unified architecture for sampling and verification" Mar. 31, 2017, pp. 1-14. (Year: 2017).*
Moran et al., "Quintuple: a Python 5-qubit quantum computer simulator to facilitate cloud quantum computing" Jun. 29, 2016, pp. 1-18. (Year: 2016).*

Hu et al., "Relative quantum coherence, incompatibility, and quantum correlations of states" May 10, 2017, pp. 1-6. (Year: 2017).*
Smith et al., "A Practical Quantum Instruction Set Architecture" Feb. 17, 2017. (Year: 2017).*
Martinis et al., "Nonlinear Calibration of a Quantum Computing Apparatus" Jun. 26, 2017 U.S. Appl. No. 62/525,058. (Year: 2017).*
Benedetti et al., "Quantum-assisted Helmholtz machines: A quantum-classical deep learning framework for industrial datasets in near-term devices" Aug. 31, 2017, arXiv: 1708.09784v1, pp. 1-10. (Year: 2017).*
Florjanczyk et Brun "In-situ Adaptive Encoding for Asymmetric Quantum Error Correcting Codes" May 29, 2017, arXiv: 1612.05823v2, pp. 1-12. (Year: 2017).*
Lu et al., "Universal stabilization of a parametrically coupled qubit" Jul. 5, 2017, arXiv: 1707.01491v1, pp. 1-17. (Year: 2017).*
Gu et al., "Microwave photonics with superconducting quantum circuits" Jul. 7, 2017, arXiv: 1707.02046v1, pp. 1-166. (Year: 2017).*
Rocchetto, Andrea "Stabiliser states are efficiently PAC-learnable" Apr. 30, 2017, arXiv: 1705.00345v1, pp. 1-9. (Year: 2017).*
Dive et al., "In situ upgrade of quantum simulators to universal computers" Jan. 6, 2017, arXiv: 1701.01723v1, pp. 1-5. (Year: 2017).*
Dunjko et Briegel, "Machine learning and artificial intelligence in the quantum domain" Sep. 8, 2017, arXiv: 1709.02779v1, pp. 1-106. (Year: 2017).*
Cortez et al., "Rapid estimation of drifting parameters in continuously measured quantum systems" Jun. 4, 2016, arXiv: 1606.01407v1, pp. 1-11. (Year: 2016).*
Fu et al., "An Experimental Microachitecture for a Superconducting Quantum Processor" Aug. 25, 2017, arXiv: 1708.07677v1, pp. 1-13. (Year: 2017).*
McKay et al., "Universal Gate for Fixed-Frequency Qubits via a Tunable Bus" 2016, pp. 1-10. (Year: 2016).*
McKay et al., "Efficient Z-Gates for Quantum Computing" Jun. 28, 2017, arXiv: 1612.00858v2, pp. 1-8. (Year: 2017).*
EPO, Extended European Search Report dated Dec. 17, 2020, in EP 18764972.8, 12 pgs.
Kelly, et al., "Scalable in-situ qubit calibration during repetitive error detection", arXiv:1603.03082v1, Mar. 9, 2016, 5 pgs.
Koch, Jens, et al., "Charge insensitive qubit design derived from the Cooper pair box", Phys. Rev. A 76, 042319, Oct. 12, 2007, 19 pgs.
Ware, "Flux-tunable superconducting transmons for quantum information processing", retrieved from the Internet on Dec. 8, 2020: https://surface.syr.edu/etd/249?utm_source=surface.syr.edu%2Fetd%2F249&utm_medium=PDF&utm_campaign=PDFCoverPages, Jun. 15, 2015, 148 pgs.
USPTO, Non-Final Office Action dated Dec. 6, 2019, in U.S. Appl. No. 16/390,964, 14 pgs.
WIPO, International Search Report and Written Opinion dated Jul. 16, 2018, in PCT/US2018/021652, 14 pgs.
USPTO, Non-Final Office Action dated Feb. 9, 2022, in U.S. Appl. No. 17/338,024, 22 pgs.
AUIPO, Examination Report No. 1 dated Oct. 29, 2021, in AU 2018230440, 3 pgs.
USPTO, Non-Final Office Action dated Jul. 30, 2018, in U.S. Appl. No. 15/916,367, 11 pgs.
USPTO, Third Party Submission filed Oct. 23, 2018, in U.S. Appl. No. 15/916,367, 40 pgs.
Castelvecchi, "Quantum cloud goes commercial", Nature 543, Mar. 9, 2017, 1 pg.
Dicarlo, et al., "Demonstration of Two-Qubit Algorithms with a Superconducting Quantum Processor", arXiv:0903.2030v2, May 4, 2009, 12 pgs.
Michielsen, et al., "Benchmarking gate-based quantum computers", arXiv: 1706.04341v1, Jun. 14, 2017, 33 pgs.
Newville, M., et al., "Non-Linear Least-Squares Minimization and Curve-Fitting for Python", Release 0.9.3, Mar. 27, 2016, 94 pages.
Reagor, et al., "Demonstration of Universal Parametric Entangling Gates on a Multi-Qubit Lattice", arXiv: 1706.06570, Jul. 13, 2017, 7 pgs.

(56) References Cited

OTHER PUBLICATIONS

Reagor, Matthew James, "Superconducting Cavities for Circuit Quantum Electrodynamics", Dissertation, Yale University, Dec. 2015, 220 pgs.

Reed, Matthew D., "Entanglement and Quantum Error Correction with Superconducting Qubits", arXiv: 1311.6759v1, Nov. 26, 2013, 370 pgs.

Stenberg, M. P. V., et al., "Characterization of decohering quantum systems: Machine learning approach", arXiv:1510.05655v1 [quant-ph], Oct. 19, 2015, 8 pages.

European Patent Office, Communication pursuant to Article 94(3) EPC issued in Application No. 18764972.8 dated May 17, 2023, 38 pages.

Menke, Tim, "Realizing a Calibration Program for Superconducting Qubits", Swiss Federal Institute of Technology Zurich, Laboratory for Solid State Physics Quantum Device Lab, Semester Thesis, Aug. 2013, 26 pages.

\* cited by examiner

MAINTAINING CALIBRATION IN A QUANTUM COMPUTING SYSTEM

CROSS-REFERENCE TO RELATED APPLICATIONS

This application claims priority to U.S. Provisional Application Ser. No. 62/560,004 entitled "Maintaining Calibration in a Quantum Computing System" and filed on Sep. 18, 2017. The priority application is incorporated herein by reference.

BACKGROUND

The following description relates to maintaining calibration in a quantum computing system.

Quantum computing systems include components that are sensitive to operating conditions. For example, a quantum processor may include components that are designed to operate at precise temperatures or in a precisely tuned electromagnetic environment. Thus, quantum computing systems typically require extensive measurement and calibration procedures to initialize the system for operation.

DETAILED DESCRIPTION

In some aspects of what is described here, a quantum computing system performs a calibration stability analysis routine, and may execute a runtime scheduler with recalibration, to improve operation of the quantum computing system. In some implementations, the stability analysis routine improves the duty cycle of the quantum computing system by reducing down time for recalibration, thereby increasing availability of the system for executing quantum algorithms. The runtime scheduler may be used to further improve system operation, for example, to provide management of many users of a consumer-facing system.

To utilize higher computational capacity of quantum computing resources, quantum computers can be deployed with a higher duty cycle, so that they are usable and viable for long periods of time with minimal down time. To achieve these and other advantages, a computing system can analyze drift and other behaviors and implement a robust, repeatable, and fast re-calibration technique. Deploying an improved (or optimal) re-calibration technique will provide a better user experience and higher system utilization. Moreover, an accurate stability model can allow for improved performance between calibration cycles and provide confidence intervals for expected performance.

Figure 1:
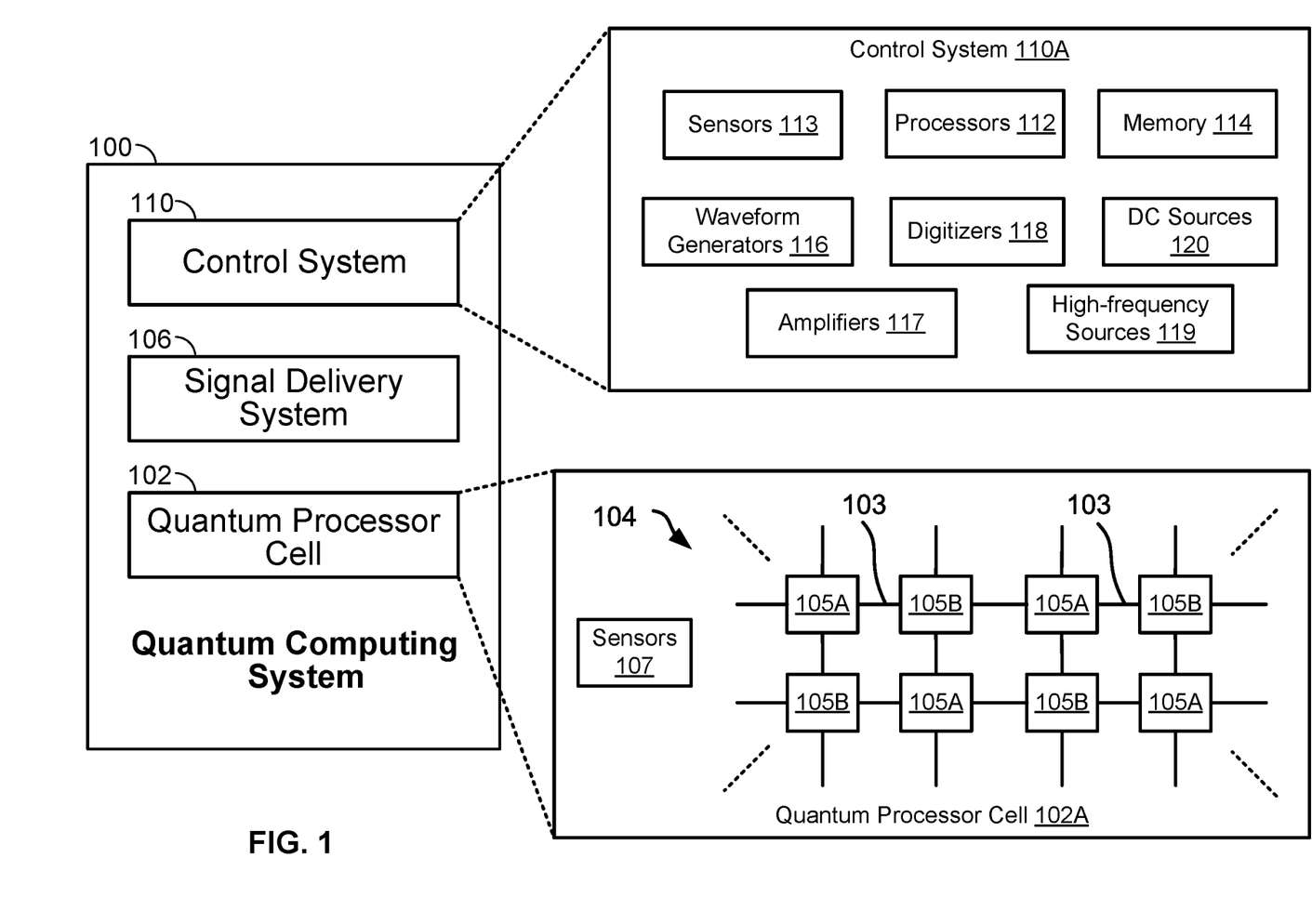
FIG. 1 is a block diagram of an example quantum computing system.

FIG. 1 is a schematic diagram of an example quantum computing system 100.

The example quantum computing system 100 shown in FIG. 1 includes a control system 110, a signal delivery system 106, and a quantum processor cell 102. A quantum computing system may include additional or different features, and the components of a quantum computing system may operate as described with respect to FIG. 1 or in another manner.

The example quantum computing system 100 shown in FIG. 1 can perform quantum computational tasks by executing quantum algorithms. In some implementations, the quantum computing system 100 can perform quantum computation by storing and manipulating information within individual quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits.

In some implementations, the quantum computing system 100 can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, the quantum computing system 100 can operate using adiabatic models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, topological quantum error correction schemes can operate on a lattice of nearest-neighbor coupled qubits. In some instances, these and other types of quantum error correcting schemes can be adapted for a two- or three-dimensional lattice of nearest neighbor coupled qubits, for example, to achieve fault-tolerant quantum computation. Adjacent pairs of qubits in the lattice can be addressed, for example, with two-qubit logic operations that are capable of generating entanglement, independent of other pairs in the lattice. In some implementations, the quantum computing system 100 is constructed and operated according to a scalable quantum computing architecture. For example, in some cases, the architecture can be scaled to a large number of qubits to achieve large-scale general purpose coherent quantum computing.

In some instances, all or part of the quantum processor cell 102 functions as a quantum processor, a quantum memory, or another type of subsystem. In some examples, the quantum processor cell includes a quantum circuit system. The quantum circuit system may include qubit devices, resonator devices and possibly other devices that are used to store and process quantum information. In some cases, the quantum information processor 102 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102. In some cases, the quantum information processor 102 includes an ion trap system, and the qubit devices are implemented as trapped ions controlled by optical signals delivered to the quantum processor cell. In some cases, the quantum information processor 102 includes a spin system, and the qubit devices are implemented as nuclear or electron spins controlled by microwave or radio-frequency signals delivered to the quantum processor cell 102. The quantum processor cell 102 may be implemented based on another physical modality of quantum computing.

In some implementations, the example quantum processor cell 102 can process quantum information by applying control signals to the qubit devices housed in the quantum processor cell 102. The control signals can be configured to encode information in the qubit devices, to process the information by performing quantum logic gates or other types of operations, or to extract information from the qubit devices. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a quantum error correction procedure, a quantum state distillation procedure, or a combination of these and other types of operations.

FIG. 1 shows an example quantum processor cell 102A that includes a superconducting quantum circuit system 104. The example superconducting quantum circuit system 104 includes qubit devices 105A, 105B arranged in a two-dimensional device array. The qubit devices each store a single qubit of information, and the qubits collectively represent the computational state of a quantum processor. In some cases, the superconducting quantum circuit system 104 may include resonator devices coupled to the respective qubit devices, for instance, where each qubit device is capacitively coupled to an associated resonator device. The readout devices may be configured to generate readout signals that indicate the computational state of the quantum processor or quantum memory. In some examples, the quantum processor cell 102A includes coupler devices that selectively operate on individual qubits or pairs of qubits. For example, the coupler devices may produce entanglement or other multi-qubit states over two or more qubits. The superconducting quantum circuit system 104 may include additional devices (e.g., additional qubit devices, coupler devices and other types of devices).

In the example shown in FIG. 1, the quantum processor cell 102A includes two different types of qubit devices—fixed-frequency qubit devices 105A and tunable-frequency qubit devices 105B. In the example shown, each qubit device 105A, 105B defines a transition frequency between the two quantum states (e.g., a ground state and first excited state) of an individual qubit.

The transition frequencies of the example fixed-frequency qubit devices 105A are not tunable by application of an offset field and are independent of magnetic flux experienced by the qubit device. For instance, a fixed-frequency qubit device may have a fixed transition frequency that is defined by an electronic circuit of the qubit device. As an example, a superconducting qubit device (e.g., a fixed-frequency transmon qubit or another type of fixed-frequency qubit device.) may be implemented without a SQUID loop. In some examples, a fixed-frequency qubit device includes a single Josephson junction, and the transition frequency of the fixed-frequency qubit device is defined at least in part by a Josephson energy of the Josephson junction (independent of a magnetic flux experienced by the fixed-frequency qubit device).

The transition frequencies of the example tunable-frequency qubit devices 105B are tunable, for example, by application of an offset field. For instance, a tunable qubit device may include a superconducting loop (e.g., a SQUID loop) that is tunable by application of magnetic flux. In some examples, the tunable qubit devices are implemented as tunable transmon qubit devices, flux qubit devices, flatsonium qubit devices, fluxonium qubit devices, or other types of tunable devices. In some examples, a tunable qubit device includes a superconducting circuit loop that receives a magnetic flux that tunes the transition frequency of the tunable qubit device. As an example, the superconducting circuit loop may include two Josephson junctions, and the tunable qubit device may also include a capacitor structure in parallel with each of the two Josephson junctions. The transition frequency of the tunable qubit device may be defined at least in part by Josephson energies of the two Josephson junctions, a capacitance of the capacitor structure and a magnetic flux threading the superconducting circuit loop. For example, the magnetic flux $\Phi(t)$ through the SQUID loop can be modified in order to tune the transition frequency of the qubit device. In some cases, an inductor or other type of flux-bias device is coupled to the SQUID loop by a mutual inductance, and the magnetic flux $\Phi(t)$ through the SQUID loop can be controlled by the current through the inductor. In some cases, a coupling strength can be controlled by both AC and DC components of the current.

In some instances, the tunable-frequency qubit devices 105B can be selectively activated by an offset field that does not directly affect the information encoded in the fixed-frequency qubit devices 105A. For instance, although the offset field may cause a tunable-frequency qubit device to interact with one of the fixed-frequency qubit devices, the offset field does not modify the transition frequencies of the other fixed-frequency qubit devices (even if the fixed-frequency qubit devices experience the offset field). In this manner, the combination of tunable qubit devices with fixed-frequency qubit devices may allow selective, on-demand coupling of qubit devices while improving performance of the qubit devices. For example, the qubit devices may have longer coherence times, may be more robust against environmental or applied offset fields, etc.

The example quantum circuit system 104 also includes connections 103 between neighboring pairs of the qubit devices 105A, 105B. The connections 103 can provide electromagnetic communication between the connected circuit devices. In some cases, the connections 103 are implemented as capacitive or conductive connections. For instance, the connections 103 may include metal traces, capacitors, bonds and other components. The qubit devices 105A, 105B may be operated by microwave signals delivered in the quantum circuit system 104, for example, from the control system 110. Signals may be exchanged among the qubit devices 105A, 105B through the connections 103 or other signal pathways in the quantum circuit system 104.

The example quantum processor cell 102A may also include one or more sensors 107. The sensors 107 can detect operating conditions of the quantum processor cell 102A. For example, the sensors 107 may detect a magnetic bias field or another condition experienced by the quantum processor cell 102A. Such sensor devices may be implemented, for instance, as circuits containing one or more SQUID loops on the same chip as the computational qubit devices 105A, 105B. Locating such sensors near one or more of the qubit devices 105A, 105B may allow the control system 110 to detect local magnetic field changes, in a continuous manner or otherwise, and may allow the control system 110 to perform feedback operations on that information, for example, to adjust magnetic biases for compensation purposes.

In the example shown in FIG. 1, the signal delivery system 106 provides communication between the control system 110 and the quantum processor cell 102. For example, the signal delivery system 106 can receive control signals from the control system 110 and deliver the control signals to the quantum processor cell 102. In some instances, the signal delivery system 106 performs preprocessing, signal conditioning, or other operations to the control signals before delivering them to the quantum processor cell 102. In some instances, the signal delivery system 106 receives qubit readout signals from the quantum processor cell and delivers the qubit readout signals to the control system 110. In some instances, the signal delivery system 106 performs preprocessing, signal conditioning or other operations on the readout signals before delivering them to the control system 110. In some implementations, the signal delivery system 106 includes input and output processing hardware, input and output connections, and other components. The input and processing hardware may include, for example, filters, attenuators, directional couplers, multiplexers, diplexers, bias components, signal channels, isolators, amplifiers, power dividers and other types of components.

In some implementations, the signal delivery system 106 and the quantum processor cell 102 are maintained in a controlled QPC environment. The QPC environment can be provided, for example, by shielding equipment, cryogenic equipment, and other types of environmental control systems. In some examples, the components in the QPC environment operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc. The levels and types of noise that are tolerated or controlled in the QPC environment can vary, for example, based on the features and operational requirements of the quantum processor cell 102 and the signal delivery system 106. The sensors 107 can be used to detect the conditions inside the thermal shieling, cryogenic equipment and other hardware components that define the QPC environment.

In the example quantum processor unit 100 shown in FIG. 1, the control system 110 controls operation of the quantum processor cell 102. The example control system 110 may include data processors, signal generators, interface components and other types of systems or subsystems. In some cases, the control system 110 includes one or more classical computers or classical computing components.

FIG. 1 shows an example control system 110A that includes processors 112, sensors 113, memory 114, waveform generators 116, amplifiers 117, digitizers 118, high-frequency sources 119 and DC sources 120. A control system may include additional or different features and components. In some examples, components of the control system 110A operate in a room temperature regime, an intermediate temperature regime, or both. For example, the control system 110A can be configured to operate at much higher temperatures and be subject to much higher levels of noise than are present in the QPC environment.

In some implementations, the control system 110 includes a classical computing cluster, servers, databases, networks, or other types of classical computing equipment. For instance, the memory 114 can include, for example, a random access memory (RAM), a storage device (e.g., a read-only memory (ROM) or others), a hard disk, or another type of storage medium. The memory 114 can include various forms of memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processors 112 may include one or more single- or multi-core microprocessors, one or more FPGAs or ASICs, one or more other types of data processing apparatus.

In the example shown, the waveform generators 116 and the DC sources 120 can each generate control signals based on control information provided by the processors 112. The control signals can be delivered to the quantum processor cell 102 by the signal delivery system 106, for example, and interact with the qubit devices 105A, 105B. In the example shown, the digitizers 118 can receive and process signals from the quantum processor cell 102. For example, the received signals can be mixed with reference signals from the high-frequency sources 119 and digitized by digitizers 118. The digitizers 118 and other processing hardware can process (e.g., digitize, or otherwise process) the signals from the quantum processor cell 102 and provide the processed information to the processors 112. The processors 112 can extract data, for example, to identify the quantum states of qubits in the quantum processor cell 102 or for other purposes.

In some implementations, the sensors 113 monitor operating conditions of the control system 110A. For example, the sensors 113 may include temperature sensors, humidity sensors, seismic sensors, or other types of sensors that detect temperatures, humidity, seismic activity or other conditions of the environment. In some cases, the sensors 113 detect consumption or use of computer resources, network resources, or other resources in the control system 100. For instance, the sensors 113 may detect consumption of computing power by the processors 112, speed or lag of data network connections (e.g., Internet speed), or other conditions. In some cases, the control system 110A includes a network of sensors, with at least one sensor attached to or in proximity to each hardware device. For example, each of the processors 112, memory 114, waveform generators 116, amplifiers 117, digitizers 118, high-frequency source 119 and DC sources 120 may have a dedicated sensor that monitors temperature or another condition.

Sensors 113 may be attached to, placed in proximity to, built into or otherwise configured to monitor hardware components in the control system 110A and the signal delivery system 106. Sensors 113 may be positioned to detect conditions of digital-to-analog converters (DACs) in the control system 110A. DACs may include transistor based amplification circuitry that provide time-dependent gain, for instance, because of temperature fluctuations, and the sensors 113 can measure the temperature fluctuations. Sensors 113 may be positioned to detect conditions of circuitry such as switches, splitters or directional couplers, for example, to sample all or a portion of the output signal with a measurement device, such as a spectrum analyzer or analog to digital converter (ADC). This information may be accumulated with other information to adjust control output settings to control the effective amplitudes.

In some instances, the control system 110 generates classical signals, including electrical waveforms or laser fields, which interact with devices in the quantum processor cell 102 to operate the quantum computing system 100; and the control system 110 may also receive classical signals back from the devices. To ensure that the classical signals are precisely tuned to the relevant device to give the desired device behavior and system operation, the control system 110 can be calibrated to the device.

In some instances, the control system 110 implements a calibration process that performs measurements on a quantum computing device and interprets those measurements to extract control parameters and device characteristics. The device characteristics can be physical attributes of the device, for example, the resonance frequency between the two lowest energy levels of a qubit. Device characteristics can be used to describe the performance of the device, for example, with respect to design goals. Control parameters can be parameters of the control system 110 that are calibrated to the device, for example, the optimal power setting for applying a read-out pulse. Correct determination of control parameters can be important, for example, to enable operation of the quantum computing system 100.

In some cases, device characteristics and characteristics of other components in the quantum computing system 100 can vary in response to conditions (e.g., temperature, humidity, noise, mechanical and electrical settings, etc.) of the quantum processor cell 102, the signal delivery system 106, or the control system 110. Data from the sensors 113 or the sensors 107 may be fed into a calibration process, a stability model, or another process that calibrates and updates the control parameters of the quantum computing system 100. The control system 110 can implement a calibration maintenance procedure (e.g., the process 300 shown in FIG. 3 or another type of procedure) to maintain an operating regime of the quantum computing system 100. For instance, the calibration maintenance procedure can be implemented to maintain the fidelity of quantum logic gates, qubit readout processes, or other types of procedures over time.

In some implementations, the control system 100 includes a calibration maintenance subsystem (e.g., the system 200 shown in FIG. 2 or another type of system) that operates in parallel with other subsystems in the quantum computing system. The calibration maintenance system can systematically monitor conditions and update calibration data, system settings, and stability models over time (e.g., periodically, at designated times or milestone events, as needed in response to changes in operating conditions or performance, etc.). Historical information can be fed forward to inform each recalibration or update performed by the calibration maintenance subsystem. In this manner, the useful lifetime of calibration data and other information can be extended to improve operation of the quantum computing system 100.

Figure 2:
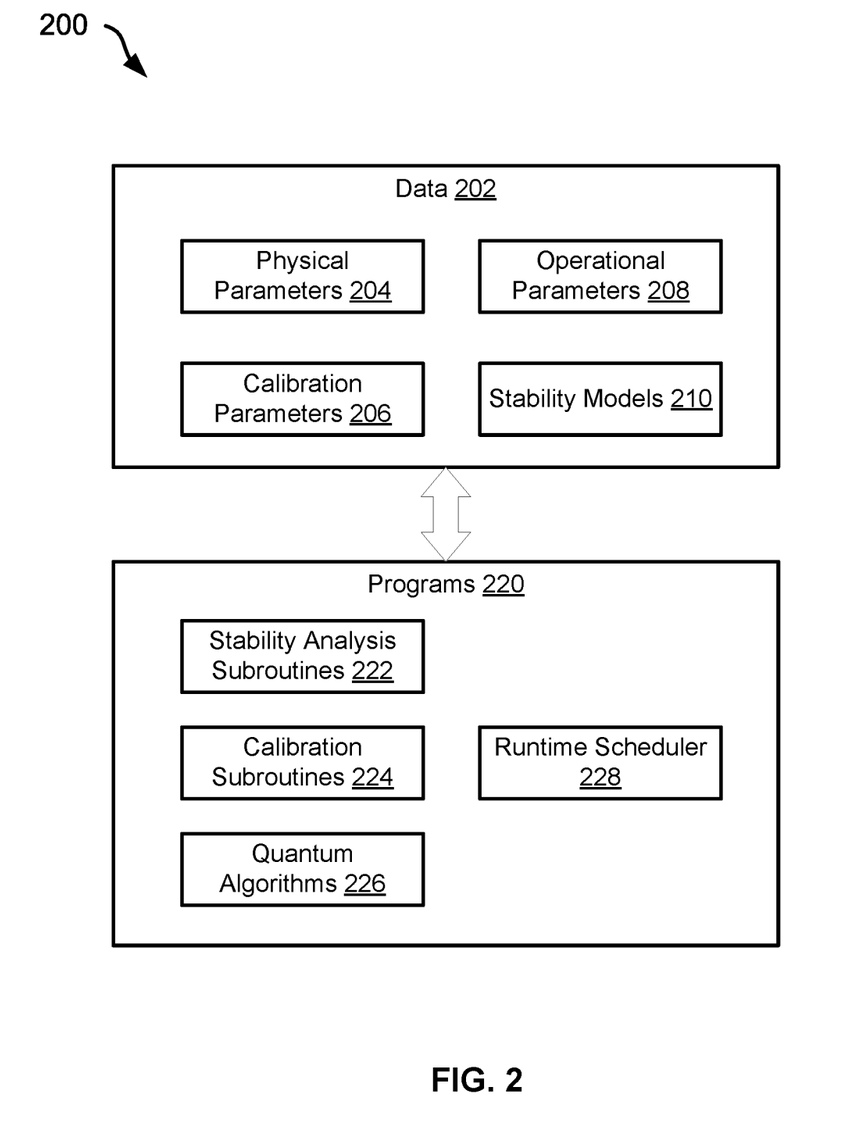
FIG. 2 is a block diagram of an example system for maintaining calibration in a quantum computing system.

FIG. 2 is a block diagram of an example system 200 for maintaining calibration in a quantum computing system. The example system 200 shown in FIG. 2 includes data 202 and programs 220. The example data 202 includes physical parameters 204, calibration parameters 206, operational parameters 208, and stability models 210. The example programs 220 include stability analysis subroutines 222, calibration subroutines 224, quantum algorithms 226, and a runtime scheduler 228. The system 200 may include additional or different components, including other types of data and other types of programs, and the components may operate as described with respect to FIG. 2 or in another manner.

In some environments, some or all components of the system 200 are implemented in software or firmware, for example, as one or more software modules executed by the processor 112 in the control system 110A shown in FIG. 1 or by another type of data processing apparatus (e.g., on a server that is remote from a quantum computing system). In some environments, some or all components of the system 200 are implemented in hardware, for example, as one or more FPGAs, ASICs or other types of programmable hardware. Combinations of hardware and software and other types of system components may be used in some cases.

The example system 200 can enable improved operation of a quantum computing system. For instance, the system 200 may enable the quantum computing system 100 shown in FIG. 1 to be utilized for quantum computation at increased or maximum duty cycle, at increased or maximal fidelity, or in another improved state of operation.

The example physical parameters 204 represent physical parameters of operations performed in a quantum computing system. For example, the physical parameters 204 may indicate the voltage, phase, frequency, time duration, or other parameters of a control signal.

The example operational parameters 208 represent operational parameters of operations performed in a quantum computing system. For example, the operational parameters 208 may indicate the Rabi rate or rotation angle produced by a control signal applied to a qubit device.

The example calibration parameters 206 include conversions between physical parameters 204 and operational parameters 208, which may be specified in physical units (e.g. voltage or seconds) or operational units (e.g. Rabi rate or specific Bloch sphere rotation-angle). The calibration parameters 206 may be updated or otherwise defined based on output from the calibration subroutines 224.

The example stability models 210 are statistical models that allow for the prediction of future parameters based on a historical record of stability analyses. For instance, the stability models 210 may be used to predict values for physical parameters 204, calibration parameters 206, operational parameters 208, or any combination of these and other types of parameters. The stability models 210 may be updated or otherwise defined based on output from the stability analysis subroutines 222.

The stability models 210 can include a variety of models to represent various physical phenomena that can affect calibration of a quantum computing system. For instance, certain operating conditions may vary on a periodic cycle (e.g., daily, weekly, monthly, yearly, etc.), and a stability model can have a periodic structure (e.g., sinusoidal, etc.) that represents the periodic cycle. As an example, a stability model can represent temperature variations on a day/night cycle, a seasonal cycle, etc.

Stability models can be made arbitrarily simple or complex, based on theoretical models, predictive models, empirical models, etc. For instance, the stability models 210 can model jumps (rapid or instantaneous increases or decreases), stochastic changes (random variations), drifts, or other types of changes in parameters. Stability models may have any number of independent and dependent variables, and can model any type of noise (e.g. white noise, 1/f or pink noise, etc.) or other physical process affecting the quantum computing system. For instance, noise affecting qubit devices may be related to two-level systems bound to the surface of the circuit. Molecular physics may occur as random-walk processes. The statistics of random-walks may be well represented by a diffusion model. The uncertainty (variance) of a parameter undergoing diffusion increases as the square root of time. If the diffusion constant of the quantum computer parameter undergoing random-walks is known, the future parameter value can be known within a statistically justified uncertainty. This information can be shared with end users or to inform the rate of system recalibration.

The example calibration subroutines 224 are executable programs that return calibration parameters for a given operation (e.g. single qubit gates, two-qubit gates, etc.). Each calibration subroutine 224 may capture a particular physical parameter or parameters that allow for the high-fidelity operation of the quantum computing system.

The example stability analysis subroutines 222 are executable programs whose output is compared to expected values, wherein measurable differences between output and expected values can be attributed to parameters that no longer specify the correct operation. Furthermore, executing these analyses may provide actionable insight into the scheduling of recalibration.

The example quantum algorithms 226 are executable programs and scripts that leverage the quantum computing system for computation. For example, the quantum algorithms 226 may include programs configured to execute a quantum logic circuit.

The example runtime scheduler 228 is an executable program that determines the order of execution of a set of quantum algorithms 226, automated calibration subroutines 224, and stability analysis subroutines 222, both for the type of recalibration being performed, and the subset of the quantum processor unit (QPU) on which the calibration is being performed. The runtime scheduler 228 can be executed by a server or other orchestrating infrastructure of a quantum computing system.

In some aspects of operation of the system 200, after values of calibration parameters 206 are known (after execution of calibration subroutines 224), stability analysis is performed (by executing stability analysis subroutines 222). The output of the stability analysis (e.g., statistical models for calibration parameters) informs the runtime scheduler 228 as to how often automated calibration subroutines 224 are inserted into the queue of executions, as well as providing estimates for future values of parameters. Each physical parameter 204 could have different stability constraints and models, leading to automated calibration modules having different frequencies of occurrence within the schedule.

Figure 3:
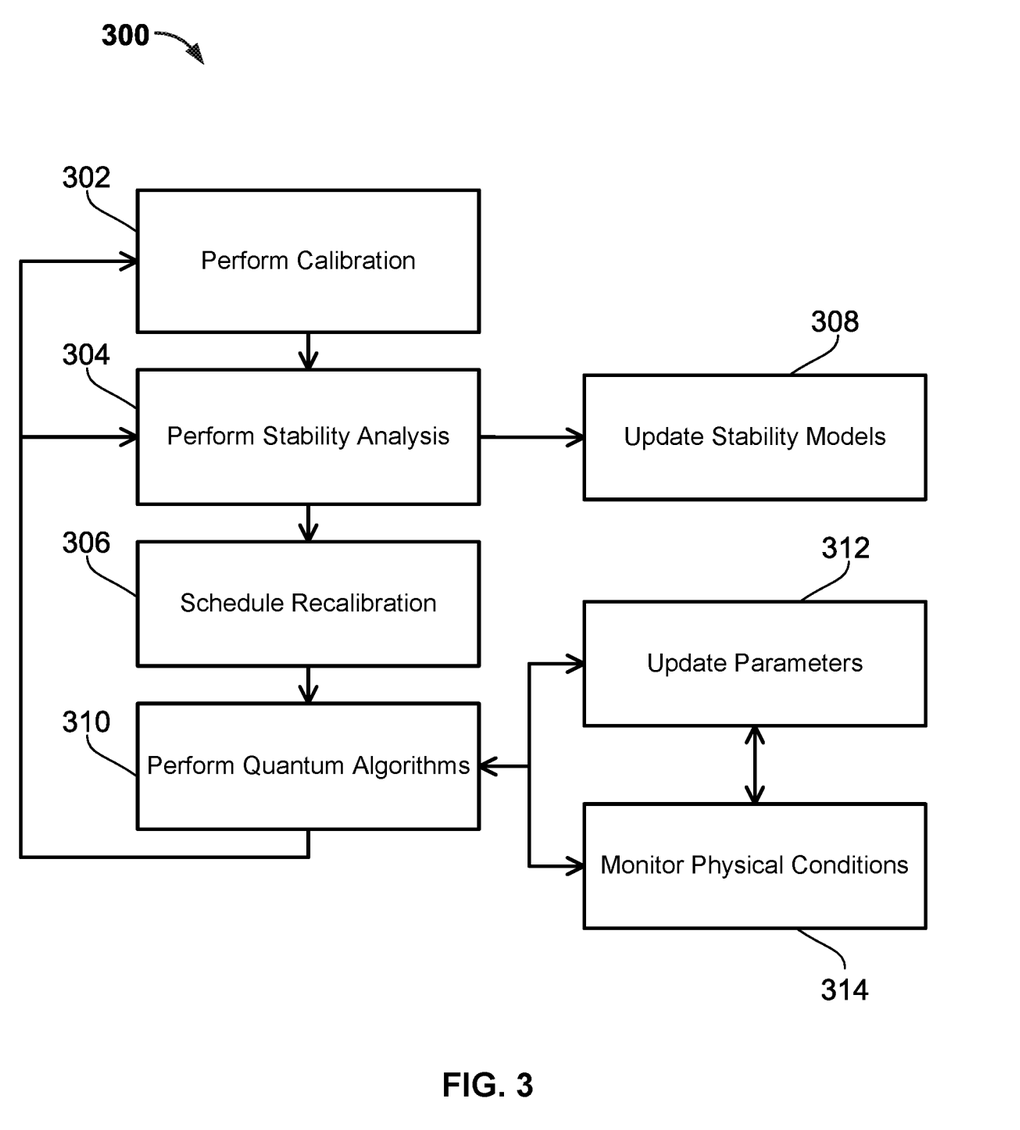
FIG. 3 is a block diagram of an example process for maintaining calibration in a quantum computing system.

FIG. 3 is a block diagram of an example process 300 for maintaining calibration in a quantum computing system. Operations in the example process 300 may be performed by a data processing apparatus or other components in a quantum computing system. For example, operations in the process 300 may be performed by the example system 200 in FIG. 2 or the example control system 110 in FIG. 1 to maintain calibration of the quantum computing system 100 in FIG. 1. In some implementations, aspects of the example process 300 can be performed by a remote system, such as a server or other computing device that communicates with the quantum computing system.

The example process 300 may include additional or different operations, and the operations may be performed in the order shown or in another order. In some cases, one or more of the operations shown in FIG. 3 are implemented as processes that include multiple operations, sub-processes or other types of routines. In some cases, operations can be combined, performed in another order, performed in parallel, iterated, or otherwise repeated or performed another manner.

The example process 300 can be used to maintain stability of quantum logic gates, qubit readout processes, or other types of procedures in a quantum computing system. Moreover, the process 300 may be used to maintain parameter stability in other types of systems, including more complex qubit systems. In some implementations, the process 300 is deployed in a stability analysis pipeline that is used to quantify the rate of drift or other behavior, provide insight into what causes the behavior, and provide tools to examine the structure of the behavior. In some implementations, the process 300 operates as a calibration orchestrator that systematically analyzes drift or other behaviors and uses the analysis to improve system operation and management of components.

At 302, a calibration is performed in the quantum computing system. The calibration can be performed, for example, by executing an automated calibration procedure. For instance, one or more calibration procedures described below may be executed. The calibration performed at 302 is used to determine control parameters or other operating parameters for a quantum computing system. The operating parameters may include, for example, parameters for performing qubit readout processes, parameters for performing single-qubit gates, parameters for performing two-qubit gates, or other types of operating parameters.

In some cases, the calibration process performed at 302 includes a continuous-wave (CW) characterization procedure, which may include cavity spectroscopy measurements, qubit spectroscopy measurements, T1 and T2 measurements, and others. In some cases, the calibration process can include a pulsed characterization procedure, which may include cavity spectroscopy measurements, Rabi spectroscopy measurements, Ramsey spectroscopy measurements, power Rabi measurements, T1 and T2 measurements, and others. The CW or pulsed characterization procedures may perform measurements to detect the quality factor (Q), resonance frequency, Lamb shift and other parameters of a device.

In some cases, the calibration process performed at 302 includes a gate tune-up procedure. For example, the gate tune-up procedure may include optimization of readout pulses or parameters, AC Stark coefficient measurements, pi-pulse amplitude tune-ups, Derivative Removal by Adiabatic Gate (DRAG) tune-ups, randomized benchmarking, other types of benchmarking, and others. The gate tune-up may include measurement of coupling strengths between qubit devices, characterization of tuning pulses for tunable qubit devices, and other types of measurements. In some cases, the calibration process performed at 302 includes a tune-up of multi-qubit gates, single-qubit gates, benchmarking procedures, or other types of processes.

In some cases, the calibration process performed at 302 includes a tune-up procedure for parametrically-activated two-qubit gates. The parametrically-activated two-qubit gate can be a quantum logic gate applied to a pair of qubits, where at least one of the qubits is defined on a tunable-frequency qubit device. The parametrically-activated two-qubit gate can be performed by modulating the resonance frequency of the tunable-frequency qubit device. The tune-up procedure can include, for example, characterizing both qubits, calibrating the flux drive line transfer function, determining a good candidate resonance for coupling, determining an amplitude for flux modulation, performing a multidimensional modulated flux pulse measurement, optimizing over pulse parameters, and other types of operations.

At 304, a stability analysis is performed in the quantum computing system. The stability analysis can determine how the operating parameters drift over time or vary in response to changes in operating conditions or other variables.

Examples of stability analyses are described below with respect to FIGS. 4-5. Other types of stability analysis may be performed in some cases.

At 306, recalibration is scheduled for one or more parameters. The recalibration can be schedule for a specific time (e.g., after a certain number of hours), for a specific milestone (e.g., after a certain number of quantum algorithms have executed), for a specific condition (e.g., when the system temperature is outside of a certain range), or otherwise. The recalibration is scheduled at 306 based on the stability analysis performed at 304. For example, the stability analysis may determine that an operating parameter is only valid for a specific amount of time, and recalibration of the operating parameter can be scheduled for execution after passage of the specific amount of time. As another example, the stability analysis may determine a specific range of operating conditions (e.g., temperature, bias voltage, etc.) for which an operating parameter is valid, and recalibration of the operating parameter can be programmed for execution upon detecting operating conditions outside the specified range.

At 308, stability models are updated based on the stability analysis. The stability models describe how the operating parameters vary over time or in response to changes in operating conditions or other variables. For example, the stability analysis at 304 may indicate that an operating parameter varies linearly (or periodically, exponentially, etc.) over time, and the stability model can be constructed to describe the behavior detected by the stability analysis. A stability model can include a linear function (e.g., for parameters that drift in a linear manner over time), a periodic function (e.g., for parameters that show periodic fluctuations), a Gaussian function or diffusion function (e.g., for parameters that show random variations), or other types of functions.

At 310, quantum algorithms are performed by the quantum computing system.

The quantum algorithms can be performed using the values of the operating parameters identified by the calibration performed at 302. In some cases, several quantum algorithms are executed without performing any recalibration.

At 312, parameters are updated. The parameters can be updated at 312 without performing a recalibration. For example, the operating parameters for the quantum computing system can be modified during execution of a quantum algorithm, between executions of quantum algorithms, or both.

At 314, physical conditions are monitored. The physical conditions may include operating conditions of one or more components of the quantum computing system. For example, the temperature of control system components may be monitored by a temperature sensor network, the magnetic fields in a quantum processor cell may be monitored by a resonator or bias circuitry, or other types of operating conditions (e.g., time) may be monitored.

The parameters can be updated at 312 based on the stability models defined at 308, the physical conditions monitored at 314, and possibly other information. For example, the stability model may be used to predict the drift in optimal control parameters over time, or to estimate optimal control parameters over a range of operating conditions. In some cases, operating conditions (e.g., temperature, external field, etc.) are monitored (at 314) and an operating parameter is updated in responses to a change in the operating conditions, for example, to compensate for known parameter dependencies. For example, the phase calibration for readout response signals can be updated in response to a change in bias voltage based on the model discussed with respect to FIG. 4. In some cases, an operating parameter is periodically updated over time, for example, to compensate for known drift. For example, the phase correction for a controlled-phase gate can be updated based on the linear model discussed with respect to FIG. 5.

The operations 310, 312, 314 can be performed concurrently, iteratively, or in another structured manner to improve or optimize operation of the quantum computing system. In some cases, the operations 310, 312, 314 are performed over time until a schedule recalibration, when the process 300 returns to 302 to calibrate one or more of the operating parameters. In some cases, the operations 310, 312, 314 are performed over time until a scheduled-stability analysis, when the process 300 returns to 304 to perform stability analysis and update stability models.

Some of the calibration parameters in a quantum computing system can be complex, being the result of a plurality of physical processes. In some cases, one or more operations in the process 300 can include gathering a large collection of parameter values which may allow for a machine learning (ML) model to be trained on the historical record of calibrations. For example, a linear classifier model may be trained to indicate when a quantum computer has switched between one or more relatively stable states. As another example, unsupervised or clustering type ML algorithms may indicate correlations between processes that affect the calibration of a quantum computer.

Figure 4:
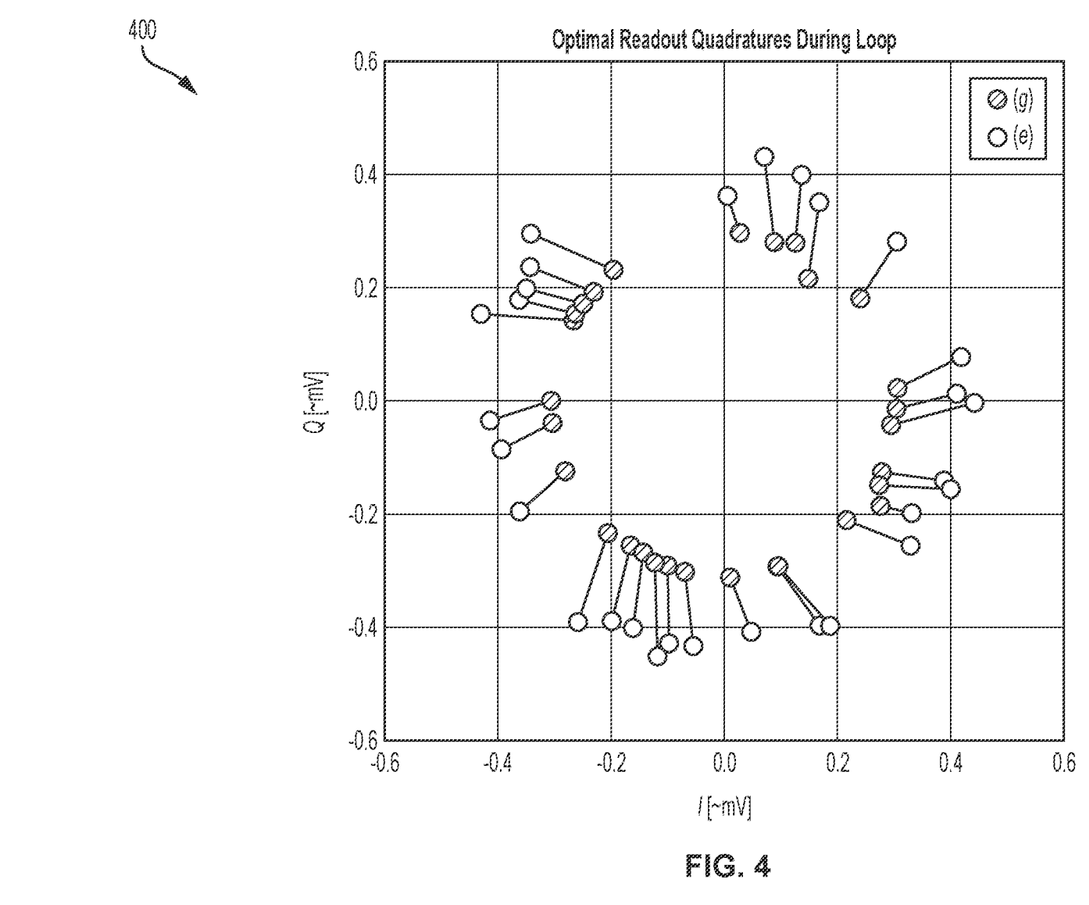
FIGS. 4-5 are plots showing example calibration data.
Figure 5:
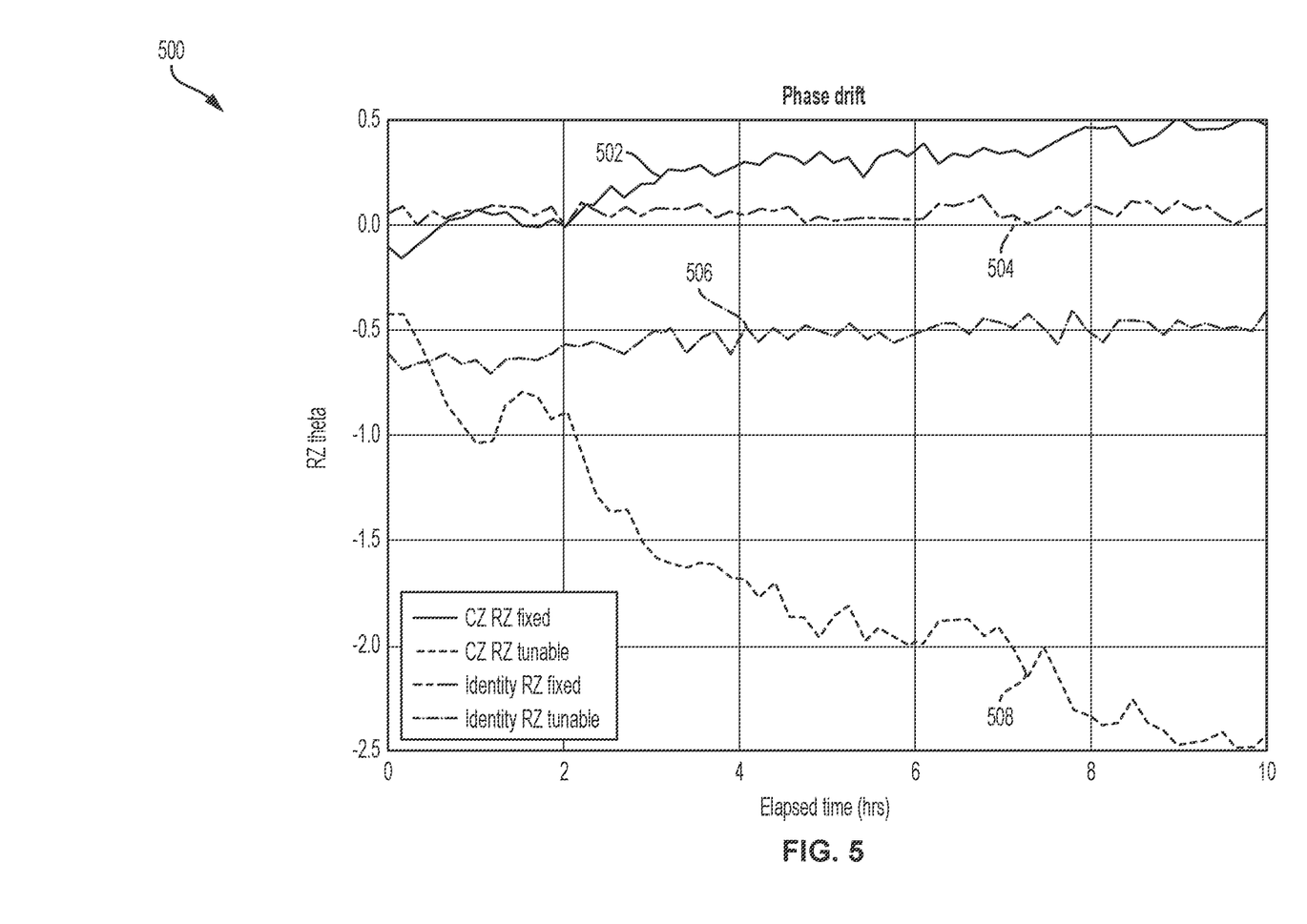

FIGS. 4-5 are plots 400, 500 showing example calibration data. The example calibration data shown in FIGS. 4-5 are based on parameter stability analyses on an eight-qubit quantum computer system. Other types of stability analyses may be used, and the stability analyses described here can be used with other types of systems.

FIG. 4 shows data for an example stability analysis of readout calibration for a tunable qubit device. Parameters of readout response signals, which indicate the state of the tunable qubit device, can be digitally calibrated (e.g., by an automated process), and the parameters can vary in response to changes in the bias voltage applied to tunable qubit device or operating conditions.

The plot 400 in FIG. 4 shows the optimal readout quadratures over a range of bias voltages on a tunable qubit device. In particular, the horizontal and vertical axes represent the in-phase (I) and quadrature (Q) components of readout response signals in units of millivolts (mV). Hatched circles in the plot 400 represent ground state |g⟩ readout response signals and unhatched circles in the plot 400 represent excited state |e⟩ readout response signals. Each pair of connected points represents the optimal readout quadrature phase for a particular bias voltage on the qubit device.

The example data in FIG. 4 shows that the optimal readout phase depends on the bias voltage applied to the tunable qubit device. In the example shown, changing the bias voltage on the tunable qubit device by 0.9 V causes the phase of the readout response (the angle of the ground state |g⟩ and excited state |e⟩ with respect to the origin) by a full 360 degrees. Therefore, the effect of bias drift in the voltage control (e.g., due to flux noise of the tunable qubit) can be correlated to a need for recalibrating or updating the readout mechanism of the system.

FIG. 5 shows data for an example stability analysis of two-qubit gate calibration for a pair of qubit devices; the pair of qubit devices includes a fixed-frequency qubit device and a tunable-frequency qubit device.

Several parameters are used to determine an optimal set of modulation parameters to achieve a target quantum logic gate, including accounting for single qubit phase accumulation during the execution of that modulation. Parameters of control signals that achieve a particular quantum logic gate can be digitally calibrated, and the parameters that achieve optimal results can vary over time.

In FIG. 5, an analysis of process tomography measurements of an example two-qubit gate (parametric controlled-phase gate) and the identity circuit were taken repeatedly over the course of 10 hours. The optimal single qubit phase corrections to maximize the average gate fidelity with respect to the ideal process matrix were tracked. Deviations of ~0.03 radians were observed run to run on short timescales as well as an overall drift occurring on long timescales in the presence of a flux modulation pulse.

The plot 500 in FIG. 5 shows changes in the optimal phase correction (phase drift) for the target operations over the 10-hour period of time. The curve 502 represents the optimal phase correction applied to the fixed-frequency qubit device in the controlled-phase (CZ) gate; the curve 508 represents the optimal phase correction applied to the tunable-frequency qubit device in the controlled-phase (CZ) gate. Similarly, the curve 504 represents the optimal phase correction applied to the fixed-frequency qubit device in the identity circuit; and the curve 506 represents the optimal phase correction applied to the tunable-frequency qubit device in the identity circuit.

With sufficient knowledge about the behavior of parameter drift, future parameters can be predicted and may be different than the approximate optimization achieved at any individual time. For example, in FIG. 5 the curve 508 is trending in a nearly linear trend of −0.2 radians per hour. This linear model can be fed forward into future operating conditions of a quantum computer, allowing for higher fidelity operation between calibration routines. Moreover, the accuracy of the statistical model, as compared to the required algorithmic fidelities, informs how frequently automated calibration routines are to be executed by the runtime scheduler.

Other parameters can be analyzed by similar types of stability analyses. For example, the modulation error in a control sequence to achieve a target entangling gate via parametric modulation can be analyzed. In some cases, a stepwise procedure can be used to estimate the correct parameters for the control sequence, including modulation frequency, amplitude, and duration. Repeating the automation routine in a loop can be a viable way of building a statistical model for the stability of each parameter. Similar analyses can be performed for single-qubit gates and other types of target operations.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, calibration is maintained in a quantum computing system.

In some aspects, a control system associated with a quantum computing system generates a stability model for a parameter of the quantum computing system. The stability model models the parameters' relationship to a condition (e.g., time, temperature, etc.) that can be monitored in the quantum computing system.

Implementations of these and other aspects may include one or more of the following features. The stability model can be used to compute a new value of an operating parameter of the quantum computing system, for example, in response to detecting a change in the condition. The stability model can be used to schedule recalibration of an operating parameter of the quantum computing system in response to detecting a change in the condition.

Implementations of these and other aspects may include one or more of the following features. The quantum computing system can include sensors to monitor the condition. The sensors may include temperature sensors (e.g., to monitor control system components or electronics, etc.), field sensors (e.g., to monitor quantum processor conditions, etc.), or other types of sensors.

Implementations of these and other aspects may include one or more of the following features. The operating parameter may include control parameters for performing quantum logic gates on a qubit device, control parameters for performing readout operations on a qubit device, etc. The qubit device can be, for example, a fixed-frequency qubit device that includes a Josephson junction in a superconducting circuit. The qubit device can be, for example, a tunable-frequency qubit device that includes SQUID loop(s) in a superconducting circuit and bias circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method executed in a quantum computing system, the method comprising:
    performing, by executing a calibration subroutine in a calibration maintenance subsystem of a control system, a calibration process in the quantum computing system to identify a value of an operating parameter of the quantum computing system, wherein the calibration process comprises:
        performing measurements on a quantum computing device in the quantum computing system; and
        interpreting the measurements to extract a control parameter and a device characteristic for the quantum computing device;
    determining, by executing a stability analysis subroutine in the calibration maintenance subsystem, a stability of the operating parameter by analyzing a variation of the value in response to a change in a condition of the quantum computing system;
    updating a stability model of the quantum computing system based on the stability of the operating parameter, wherein the stability model comprises a statistical model representing the value of the operating parameter as a function of time and configured to predict future values of the operating parameter;
    scheduling, by executing a runtime scheduler in the calibration maintenance subsystem, a recalibration of the operating parameter based on the future values of the operating parameter predicted by the stability model; and
    executing a quantum algorithm, by operation of the control system, in the quantum computing system based on the value of the operating parameter identified by the calibration process.

2. The method of claim 1, wherein determining the stability of the operating parameter comprises determining a stability over time.

3. The method of claim 1, wherein analyzing the variation of the value comprises analyzing the variation of the value in response to a change in an operating condition of one or more components of the quantum computing system.

4. The method of claim 1, wherein scheduling the recalibration comprises scheduling the recalibration for a specified time.

5. The method of claim 1, wherein scheduling the recalibration comprises scheduling the recalibration for a specified milestone.

6. The method of claim 1, comprising updating the value of the operating parameter during or after the execution of the quantum algorithm.

7. The method of claim 6, wherein the value of the operating parameter is updated based on a stability model of the quantum computing system.

8. The method of claim 6, comprising:
monitoring, by operation of the control system, a physical condition of one or more components of the quantum computing system; and
wherein the value of the operating parameter is updated based on the monitored physical condition.

9. The method of claim 1, comprising executing the scheduled recalibration after the execution of the quantum algorithm.

10. The method of claim 1, wherein performing the calibration process comprises performing a continuous-wave characterization procedure or a pulsed-wave characterization procedure.

11. The method of claim 1, wherein performing the calibration process comprises performing a gate tune-up procedure.

12. The method of claim 1, comprising:
gathering multiple values of the operating parameter to create a historical record of calibrations; and
training a machine learning model on the historical record of calibrations.

13. The method of claim 1, wherein determining the stability of the operating parameter comprises analyzing drift in the value of the operating parameter over time.

14. A quantum computing system comprising:
a quantum processor cell comprising qubit devices; and
a control system in communication with the quantum processor cell, the control system configured to perform operations comprising:
performing, by executing a calibration subroutine, a calibration process in the quantum computing system to identify a value of an operating parameter of the quantum computing system, wherein the calibration process comprises:
performing measurements on a quantum computing device in the quantum computing system; and
interpreting the measurements to extract a control parameter and a device characteristic for the quantum computing device;
determining, by executing a stability analysis subroutine, a stability of the operating parameter by analyzing a variation of the value in response to a change in a condition of the quantum computing system;
updating a stability model of the quantum computing system based on the stability of the operating parameter, wherein the stability model comprises a statistical model representing the value of the operating parameter as a function of time and configured to predict future values of the operating parameter;
scheduling, by executing a runtime scheduler, a recalibration of the operating parameter based on the future values of the operating parameter predicted by the stability model; and
executing a quantum algorithm in the quantum computing system based on the value of the operating parameter identified by the calibration process.

15. The system of claim 14, wherein the quantum processor cell comprises a superconducting quantum circuit comprising the qubit devices; and wherein the qubit devices each comprise one or more respective Josephson junctions.

16. The system of claim 14, comprising a sensor configured to monitor the condition of the quantum computing system.

17. The system of claim 16, wherein the sensor obtains data representing the condition of the quantum computing system; and wherein analyzing the variation of the value comprises analyzing the obtained data to identify the change in the condition of the quantum computing system.

18. The system of claim 16, wherein the quantum processor cell comprises the sensor and the condition of the quantum computing system is a condition of the quantum processor cell.

19. The system of claim 16, wherein the control system comprises the sensor and the condition of the quantum computing system is a condition of the control system.

20. The system of claim 16, wherein the control system comprises the sensor and the condition of the quantum computing system is a condition of at least one of a waveform generator or a DC source in the control system.

21. The system of claim 16, wherein the control system comprises the sensor and the condition of the quantum computing system is a condition of at least one of a digital to analog converter (DAC) or an analog to digital converter (ADC) in the control system.

22. The system of claim 14, wherein the operating parameter comprises a voltage, a phase, a frequency, or a time duration.

23. The system of claim 14, wherein the operating parameter comprises a Rabi rate or a Rabi rotation angle.

24. The system of claim 14, wherein the operating parameter includes the control parameter.

25. The system of claim 14, wherein determining the stability of the operating parameter comprises analyzing drift in the value of the operating parameter over time.

* * * * *